No. 787,024. PATENTED APR. 11, 1905.
R. N. CHAMBERLAIN.
MEANS FOR CONTROLLING THE CHARGING OF STORAGE BATTERIES.
APPLICATION FILED FEB. 8, 1904.
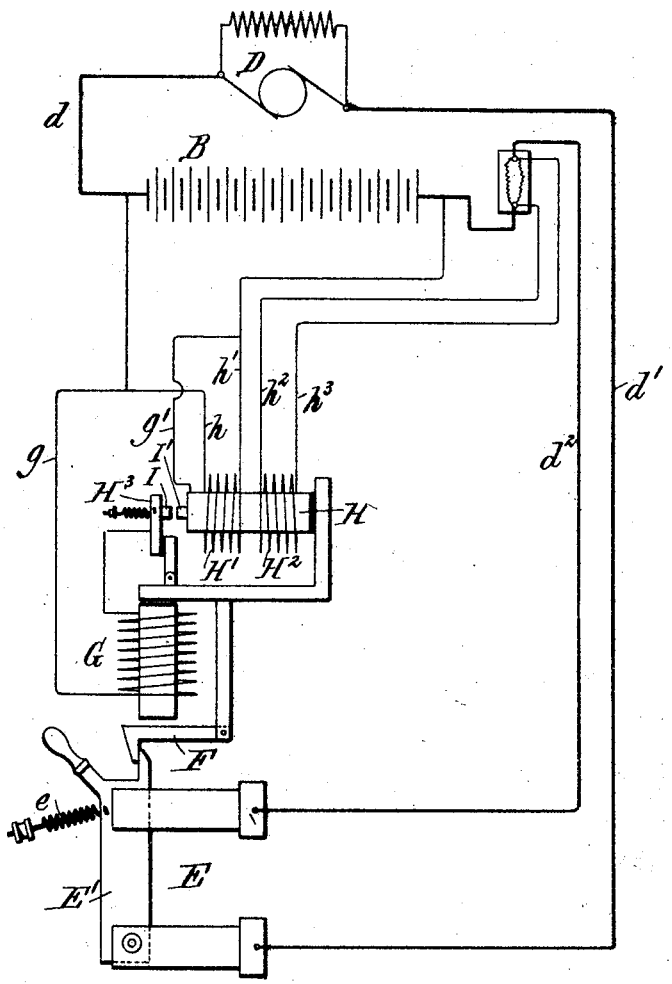
Witnesses:
E. A. Volk.
R. W. Rumer.
Inventor.
R. N. Chamberlain
by Wilhelm, Parker & Hald
Attorneys.

No. 787,024.

Patented April 11, 1905.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y.

MEANS FOR CONTROLLING THE CHARGING OF STORAGE BATTERIES.

SPECIFICATION forming part of Letters Patent No. 787,024, dated April 11, 1905.

Application filed February 8, 1904. Serial No. 192,514.

*To all whom it may concern:*

Be it known that I, RUFUS N. CHAMBERLAIN, a citizen of the United States, and a resident of Depew, in the county of Erie and State of New York, have invented a new and useful Improvement in Means for Controlling the Charging of Storage Batteries, of which the following is a specification.

This invention relates to means for charging storage batteries, and more particularly to a device for automatically opening the charging-circuit when the battery is sufficiently charged or brought to a predetermined desired condition of charge.

It is not always practical to charge a battery at a definite rate, because sometimes the time allowed for charging is short, requiring the charging rate to be abnormally high, while at other times the period during which the battery might be charged is long, when a low charging rate can be used. It is a matter of common knowledge in storage-battery engineering that the back pressure from the battery in charging is more or less in proportion to the charging rate, increasing as the charging rate rises and decreasing as it lowers. Attempts have been heretofore made to automatically open the charging-circuit when the battery was properly charged by a switch operated by an electromagnet having a single coil connected across the battery; but these devices have been unreliable or useless in practice, for the reason that they would open the charging-circuit at varying stages of the charging operation according to the variations in the charging rate, thus at times opening the circuit before the battery was fully charged and at other times permitting an overcharge.

The object of this invention is to remedy these defects and provide an efficient and practical means which will enable an operator to put an ordinary storage battery on charge at whatever rate is convenient or necessary at the time and which will automatically open the charging-circuit only when the battery is charged to the predetermined desired extent regardless of the rate of charge and the changes in the voltage of the charging-circuit during the charging process, whereby the battery only consumes the amount of power that it properly requires and prevents the waste due to overcharging. This result is accomplished in the device hereinafter described by providing the switch-controlling magnet with a coil connected across a shunt of the charging-circuit and acting differentially relative to the other coil which is connected across the battery.

The accompanying drawing illustrates diagrammatically means embodying the invention for automatically opening the charging-circuit when the battery is charged to the predetermined desired extent.

Referring to the drawing, B represents the storage battery or batteries, and D the dynamo or generator for charging the battery and which is connected to one terminal of the battery by a conductor $d$ and to the other terminal of the battery by conductors $d'$ and $d^2$, which are connected by a switch E. The movable blade or lever E' of this switch is moved by hand into contact with the stationary blade to close the charging-circuit and place the battery on charge and is held in closed position by a suitable latch F, which is automatically operated when the battery is charged to the predetermined amount to release the switch-blade, which is moved by a spring $e$ or other device to open the charging-circuit.

The latch F for releasing the switch lever or blade in the construction illustrated constitutes the armature of an electromagnet G, which is provided with an energizing-coil in a normally open circuit $g$ $g'$, connected across the battery or to any other source of electric energy. This circuit is closed when the battery is charged by an automatic or pilot magnet H, which is provided with an energizing or magnetizing coil H', connected across the battery by conductors $h$ $h'$, and a second differentially-wound or opposing coil H², which is connected across a shunt $h^2 h^3$ of the charging-circuit. When the battery is charged to the desired extent, the pilot-magnet attracts its armature H³, thereby placing the normally separated contacts I and I', which are connected to the conductors of the coil for the latch-operating magnet, in contact and closing the circuit to energize the magnet, which attracts the latch F and releases the switch-blade, so that the latter is moved by its spring to open the charging-circuit.

The operation of the device is as follows: The operator closes the switch E to place the battery on charge and adjusts the charging rate according to the time allowed for the battery to receive a full charge. The entire amount of currrent passing through the battery or batteries will pass through the conductor $d^2$ of the charging-circuit, the shunt $h^2 h^3$, and the coil H² of the pilot-magnet connected thereto, and the other coil, H', of the pilot-magnet will also be energized. If the charging rate of the battery increases, the amount of current passing through the shunt also increases, thus increasing the energization of the shunt-coil H² of the pilot-magnet and compensating for the undesirable augmentation of the energization of the other coil, H', of the pilot-magnet, due to the increased back pressure from the battery. Supposing, for example, that the average charging rate of the battery is sixty amperes, then when the battery is being charged at this rate it would near the end of its full charge have its back pressure raised to a point which would indicate a full charge. This pressure exerted on the magnetizing-coil H' of the pilot-magnet predominates over the energization of the opposing coil H² thereof sufficiently to attract its armature and close the energizing-circuit $g g'$ of the latch-operating magnet, which attracts the latch and releases the switch-blade. If, however, on account of limited time it is necessary to raise the charging rate of the battery to ninety amperes, for instance, the back pressure from the battery when fully charged would be decidedly higher than the back pressure given when being charged by sixty amperes. The increasing charging rate also produces an increased energization in the shunt $h^2 h^3$ and opposing coil H² of the pilot-magnet, the effect of which is to modify to a greater degree the action of the magnetizing-coil H' than when the battery was being charged at the sixty-ampere rate, and the net magnetic effect on the pilot-magnet would be practically the same as when the battery was being charged at the sixty-ampere rate. On the other hand, suppose that the period allowed for charging the battery is longer than usual and instead of charging at the normal charging rate a thirty-ampere rate was used. In this case the battery back pressure would not rise to as high a point as it did at the sixty-ampere rate; but the opposing coil H² would have less magnetic effect on the pilot-magnet, leaving the net magnet effect on the pilot-magnet the same as when the battery was being charged at a sixty-ampere rate.

From the above it will be apparent that the attendant can simply close the switch E and adjust the charging rate according to the time allowed for fully charging the battery and without further attention the battery will receive a substantial charge, when the pilot-magnet A will cause the switch to open. Another advantage of the means described is that its practical operation is not affected by variations of the voltage in the charging-circuit during the charging operation. If the voltage of the generator or charging circuit should rise during the charging operation, the charging rate would change from the normal to an excessively high rate, or if the voltage was reduced the charging rate would lower. In either case the shunt-coil H² of the pilot-magnet would balance the effect produced by either an increase or decrease in the charging rate from that at which it had been started.

I claim as my invention—

1. The combination of a storage battery, a charging-circuit for the same, a hand-closed switch in said circuit for closing the same, a device which opens the switch automatically when the switch is released, means for holding the switch closed, and an electromagnetic releasing device for said holding means containing differential windings which cause the magnetic effect to vary inversely in accordance with variations in the charging rate of the charging-circuit, substantially as set forth.

2. The combination of a storage battery, a charging-circuit for the same, a hand-closed switch in said circuit for closing the same, a device which opens the switch automatically when the switch is released, means for holding the switch closed, and an electromagnetic releasing device for said holding means, which releasing device contains a magnetizing-coil connected across the battery and an opposing coil connected across a shunt of the charging-circuit, substantially as set forth.

3. The combination with a storage battery, and a charging-circuit, of a switch in said charging-circuit, an electromagnet for opening said switch, a normally open energizing-circuit for said magnet, a pilot-magnet for closing said normally open circuit, and means for varying the magnetic effect of said magnet in inverse correspondence with the variations in the charging rate of the charging-circuit, substantially as set forth.

4. The combination with a storage battery and a charging-circuit for the same, of a switch in said charging-circuit, an electromagnet for opening said switch, a normally open energizing-circuit for said magnet, a pilot-magnet having differential windings connected respectively across the battery and across a shunt of the energizing-circuit, and an armature which is operated by said pilot-magnet to close the energizing-circuit for said switch-operating magnet, substantially as set forth.

Witness my hand this 30th day of January, 1904.

RUFUS N. CHAMBERLAIN.

Witnesses:
CHAS. W. PARKER,
C. B. HORNBECK.